US007062540B2

(12) United States Patent
Reddy et al.

(10) Patent No.: US 7,062,540 B2
(45) Date of Patent: Jun. 13, 2006

(54) SYSTEM AND METHOD FOR REMOTELY MONITORING AND MANAGING APPLICATIONS ACROSS MULTIPLE DOMAINS

(75) Inventors: Padma P Reddy, Plano, TX (US); Rubesh Mehta, Irving, TX (US)

(73) Assignee: i2 Technologies US, Inc., Dallas, TX (US)

(*) Notice: Subject to any disclaimer, the term of this patent is extended or adjusted under 35 U.S.C. 154(b) by 880 days.

(21) Appl. No.: 09/755,751

(22) Filed: Jan. 5, 2001

(65) Prior Publication Data

US 2002/0091753 A1 Jul. 11, 2002

(51) Int. Cl.
G06F 15/16 (2006.01)

(52) U.S. Cl. .................. 709/217; 709/201; 709/202; 709/218; 709/219; 714/47; 714/48; 714/25; 714/30

(58) Field of Classification Search ............... 709/201, 709/202, 217, 218, 219; 700/26, 143; 714/47, 714/48, 25, 30
See application file for complete search history.

(56) References Cited

U.S. PATENT DOCUMENTS

| | | | | |
|---|---|---|---|---|
| 4,807,108 A | | 2/1989 | Ben-Arieh et al. ......... 364/148 |
| 5,408,519 A | | 4/1995 | Pierce et al. .................. 379/67 |
| 5,790,853 A | | 8/1998 | Nomura et al. ............. 395/674 |
| 5,826,239 A | * | 10/1998 | Du et al. ....................... 705/8 |
| 5,958,010 A | * | 9/1999 | Agarwal et al. ............ 709/224 |
| 5,987,363 A | | 11/1999 | Quan et al. .................... 701/13 |
| 6,023,507 A | * | 2/2000 | Wookey ...................... 709/224 |
| 6,115,646 A | | 9/2000 | Fiszman et al. ............ 700/181 |
| 6,321,338 B1 | * | 11/2001 | Porras et al. ............... 713/201 |
| 6,385,497 B1 | * | 5/2002 | Ogushi et al. .............. 700/110 |
| 6,487,457 B1 | * | 11/2002 | Hull et al. ..................... 700/17 |
| 6,510,350 B1 | * | 1/2003 | Steen et al. .................... 700/9 |
| 6,662,225 B1 | * | 12/2003 | Motoyama et al. ......... 709/224 |
| 6,714,976 B1 | * | 3/2004 | Wilson et al. .............. 709/224 |
| 6,735,702 B1 | * | 5/2004 | Yavatkar et al. ............. 726/13 |

OTHER PUBLICATIONS

Unknown, "Java™ Management Extensions Instrumentation and Agent Specification," v1.0, Sun Microsystems, Inc., 166 pages Jul. 2000.

(Continued)

Primary Examiner—Anthony Knight
Assistant Examiner—Thomas Pham
(74) Attorney, Agent, or Firm—Brian E. Harris; James E. Walton

(57) ABSTRACT

A system (10) for enabling remote monitoring and management of one or more applications (42) within a domain (30) includes one or more computers (40) that execute one or more applications (42) being monitored and managed. The system (10) also includes a firewall (50) that limits access to the applications (42). The system (10) further includes an application management layer (70) within the domain (30) that includes one or more agents (72) that each monitor applications (42) and that generate notifications in response to the occurrence of events associated with the applications (42). The system (10) also includes a communication layer (60) within the domain (30) that retrieves and communicates the notifications to a monitoring and management portal (20) using a communication protocol providing access through the firewall (50). The communication layer (60) may also receive a command for a particular application (42) and communicate the command to an agent (72) associated with the application (42). The agent (72) executes the command using a monitor (74) that interfaces with the application (42).

35 Claims, 3 Drawing Sheets

OTHER PUBLICATIONS

"Java™ Management Extensions Instrumentation and Agent Specification, v1.0," Sun Microsystems, Inc., 166 pages Jul. 2000.

L. Lewis, "Spectrum Service Level Management Definition, Offerings, and Strategy," Technical Note IML-CTRON-98-02, XP002150696, 17 pagesMar. 30, 1998.

R.M. Kerr, "A Knowledge Based, Integrated Process Planning and Scheduling System for Document Preparation," Advances in Production Management Systems, XP000892975, 10 pages, 1991.

"Adaptive Systems Management," Syllogic B.V., Syllogic White Paper, Version 2.1, XP-002105194, 14 pages Jan. 1998.

Microsoft Windows NT, Version 4.0, build 1381: Service Pack 6, RC 1.3. Screenshots from print manager function. 5 pages©1981-1998.

Tivoli Workload Scheduler (IBM). Version 7.0; http://www.tivoli.com/support/public/Prodman/public_manuals/td/TWS/SH19-4552-00/en_US/HTML/eqqumst454.htm#/HDRINDEX_START[online] Jun. 30, 2000 .

PCT, Notification of Transmittal of the International Search Report or the Declaration, 8 pages.

R. Joseph, "'Netting' effective e-commerce. (Internet/Web/Online Service Information)," Communications News, v36, n4, p46, Gale Group 0704409/9, 3 pages.

* cited by examiner

SYSTEM AND METHOD FOR REMOTELY MONITORING AND MANAGING APPLICATIONS ACROSS MULTIPLE DOMAINS

CROSS-REFERENCE TO RELATED APPLICATION

This application claims the benefit under 35 U.S.C. § 120 of U.S. application Ser. No. 09/639,491, filed Aug. 15, 2000, entitled "COMPUTER-IMPLEMENTED SYSTEM AND METHOD FOR MONITORING AND MANAGING BUSINESS PROCESSES AND ASSOCIATED RESOURCES."

TECHNICAL FIELD OF THE INVENTION

This invention relates to the field of application monitoring and management, and more particularly to a system and method for remotely monitoring and managing applications across multiple domains.

BACKGROUND OF THE INVENTION

Due to the increasing popularity and accessibility of the Internet, many traditional services have moved from the physical world to the Internet. For example, a multitude of Internet-accessible electronic marketplaces now exist and allow individuals and businesses to communicate and conduct transactions. Many such marketplaces are implemented using one or more applications that are executed on a computer system that is coupled to the Internet. To prevent unauthorized access to these enabling applications, the computer system supporting the applications often provides firewalls. In order to monitor and manage the operation of these applications to ensure the uninterrupted operation of the associated marketplace, a monitoring and management system may be executed on the computer system supporting the enabling applications. The owner of the computer system or another entity (such as the developer of the applications or an application service provider) may then use the monitoring and management system to monitor and manage the applications. Furthermore, an entity providing the monitoring and management service for one marketplace may provide the same service to one or more other marketplaces. However, unless that entity has been granted special access to the enabling applications through the firewalls of the associated computer systems, the entity may be required to locally monitor and manage the applications at each computer system. Such local monitoring and management may be an inefficient and complicated process.

SUMMARY OF THE INVENTION

According to the present invention, disadvantages and problems associated with previous application monitoring and management systems and methods have been substantially reduced or eliminated.

According to one embodiment of the present invention, a system for enabling remote monitoring and management of one or more applications within a domain (the domain being one of a plurality of such domains) includes one or more computers within the domain which are coupled to a network. Each computer system executes one or more applications being monitored and managed. The system also includes a firewall that limits access to the applications within the domain from the network. The system further includes an application management layer within the domain that includes one or more agents that each monitor one or more corresponding applications and that generate notifications in response to the occurrence of events associated with the corresponding applications. The application management layer also includes a gateway that receives one or more of the notifications and stores the notifications in a database. In addition, the system includes a communication layer within the domain that retrieves one or more of the notifications from the database in response to a request received from a monitoring and management portal coupled to the network. The request is communicated to the communication layer using a communication protocol providing access through the firewall. The communication layer communicates the notifications to the monitoring and management portal using the communication protocol to enable remote monitoring and management of the associated applications.

According to another embodiment of the present invention, a method for remotely monitoring applications across a number of domains includes detecting the occurrence of events associated with a number of applications executed on a number of computers within the domains. Each domain is coupled to a network and includes a firewall that limits access to the applications within the domain. The method also includes generating notifications in response to the occurrence of the events (each notification being associated with at least one application) and storing at least some of the notifications in databases within the domains that include the associated applications. The method further includes retrieving notifications from the databases of a number of selected domains in response to a request received from a monitoring portal that is coupled to the network. The request is communicated to the selected domains using a communication protocol that provides access through the firewalls associated with the selected domains. In addition, the method includes communicating the retrieved notifications from each of the selected domains to the monitoring portal using the communication protocol and making the retrieved notifications from each of the selected domains available at a computer associated with the monitoring portal for viewing in a unified manner.

According to yet another embodiment of the present invention, a method for remotely managing applications across a number of domains includes generating a command for each of a number of applications at a management portal that is coupled to a network. The applications are of a common type and are executed on a number of computers within the domains. Each domain is coupled to the network and includes a firewall that limits access to the applications within the domain. The method also includes communicating the commands to a communication layer within each of one or more selected domains using a communication protocol that provides access through the firewall associated with each selected domain. Each selected domain includes an application to which a command is directed. Within each selected domain, the method further includes communicating the command from the communication layer to an agent associated with the application to which the command is directed. The method also includes executing the command using a monitor within the agent that interfaces with the application.

The present invention provides a number of important technical advantages. For example, an application monitoring and management system is provided that allows an entity to remotely monitor and manage a number of applications that are executing on a number of different computer systems associated with a number of different domains. Through the use of hypertext transport protocol (HTTP) or other appropriate communication protocols, this remote monitoring and management capability is provided even when access to the applications is limited by firewalls. Embodiments of the present invention provide an application monitoring and management layer that interfaces with the applications and a communication layer that provides a remote monitoring and management portal with access to the application monitoring and management layer (and thus the applications and information about the applications) through the firewalls protecting the applications. Therefore, the present invention allows the entity to monitor and manage a number of diverse applications from a single remote location and does not require that the entity be granted special access (for example, through the use of a virtual private network) to the computer systems supporting the applications through their associated firewalls. Furthermore, if appropriate, information from multiple domains may be aggregated and displayed to the entity in a single view to increase the efficiency of the monitoring and management process. Other important technical advantages are readily apparent to those skilled in the art from the following figures, descriptions and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
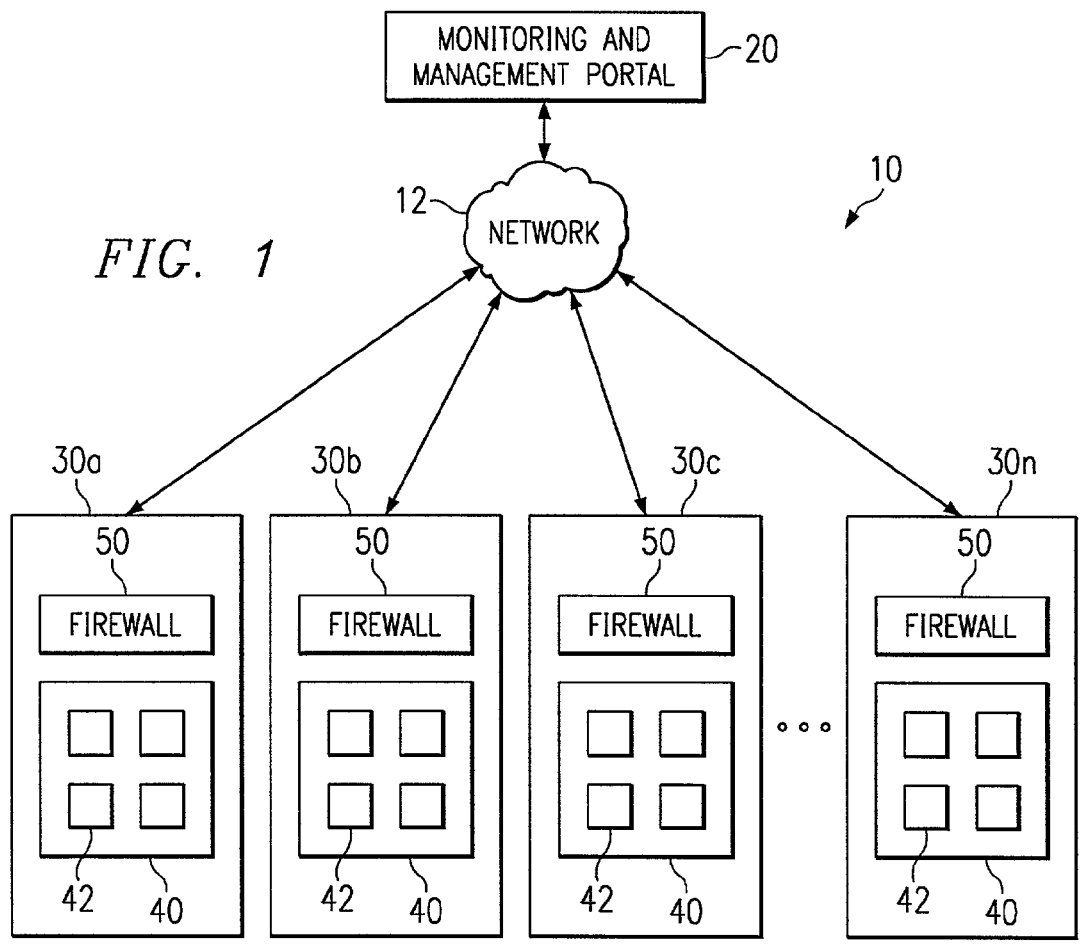
FIG. 1 illustrates an exemplary application monitoring and management system.

FIG. 1 illustrates an exemplary application monitoring and management system 10. System 10 includes a network 12 that couples a monitoring and management portal 20 and one or more domains 30. Network 12 may include the Internet and/or any other network or combination of networks that may be used to couple portal 20 and domains 30. Portal 20 may be used to remotely monitor and manage one or more applications 42 executing at one or more computer systems 40 associated with one or domains 30. In an exemplary embodiment, domains 30 are data centers each executing one or more applications 42 that facilitate business-to-business (B2B), business-to-consumer (B2C), or other electronic marketplaces. However, applications 42 may include any appropriate applications providing any appropriate functions that may be monitored and managed using portal 20. For example, domains 30 may be business enterprises and applications 42 may be business processes, planning engines, or any other suitable applications executing at the various enterprises. One example of a system and method for monitoring and managing business processes is described in copending U.S. application Ser. No. 09/639,491 filed Aug. 15, 2000, which is incorporated by reference herein.

Each domain 30 may include multiple applications 42 that operate together to provide one or more services associated with domain 30, such as electronic marketplace services. However, a single domain 30 may include applications 42 providing multiple services and/or a single service may be provided using applications 42 executing in multiple domains 30. Furthermore, multiple domains 30 may be located at a single location, such as on a computer system associated with a data center, although such co-located domains 30 may be separated using firewalls or other security measures. Each domain 30 may be controlled by a different entity and still other management entities, such may provide and/or monitor and manage applications 42 in one or more domains 30, such as application service providers (ASPs). Moreover, each domain 30 may include a firewall 50 that prevents unauthorized access to domain 30 through network 12.

Although domains 30 may be controlled and operated by various entities and applications 42 may be provided by other entities, a single management entity may be assigned the responsibility of remotely monitoring and managing applications 42 executing in multiple domains 30. However, the management entity may not have access to domains 30 (through firewalls 50) or such access may be inefficient or impractical to obtain. System 10 provides the ability, using portal 20 and certain components that may be included in domains 30 (as described below), for a management entity to remotely monitor and manage a number of applications 42 executing in a number of different domains 30 even though those domains 30 may be protected by firewalls 50 and may reside at multiple physical locations. If appropriate, portal 20 may also be used to communicate simulated transactions to applications 42 for monitoring purposes.

Figure 2:
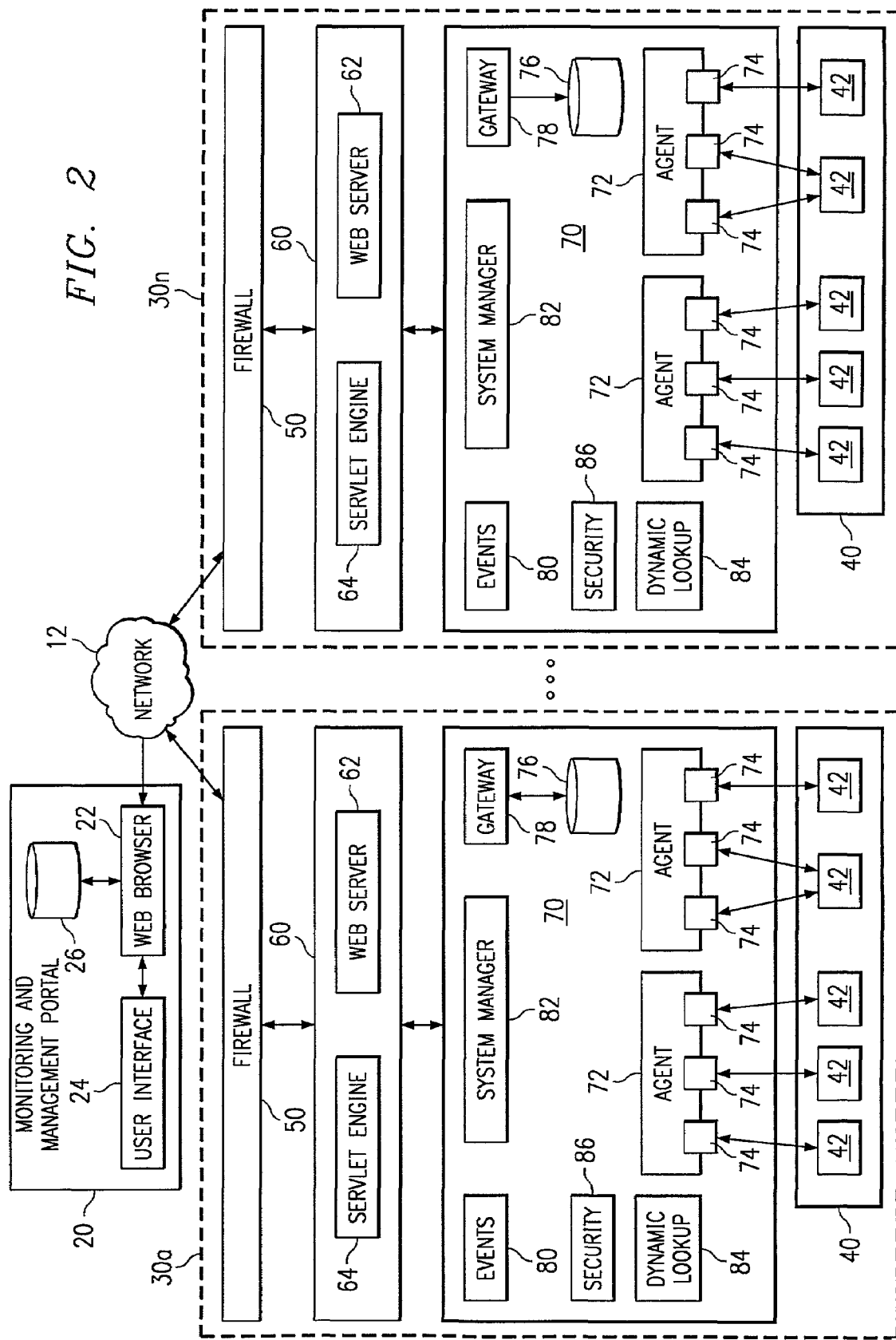
FIG. 2 illustrates components of an exemplary application monitoring and management system in further detail.

FIG. 2 illustrates exemplary components of system 10 in further detail. Exemplary monitoring and management portal 20 includes a web browser 22 that may be used to communicate with domains 30 using HTTP or another communication protocol suitable to provide web-based communications between portal 20 and domains 30. The use of the term "HTTP" is meant to include HTTP, secure HTTP (S-HTTP), or any other communication protocol based on HTTP. However, any appropriate communication interface and/or communication protocol may be used to enable a user of portal 20 to receive information from domains 30 to monitor applications 42 and to transmit commands or other communications to domains 30 to manage applications 42. Web browser 22 is coupled to a user interface 24 that provides the user with access to the information received at web browser 22 or other appropriate communication interfaces of portal 20 and that allows the user to transmit commands or other communications to domains 30. As an example only, user interface 24 may include a display for viewing information and a keyboard and a mouse to enter commands. Portal 20 also includes a repository 26 that may be used to store user profiles and preferences. These user profiles and preferences may be used to customize the monitoring and management interface provided by portal 20 and the information gathered using portal 20 (for example, specifying which applications 42 at which domains 30 a particular user wishes to monitor and manage). Web browser 22, user interface 24, repository 26, and any other appropriate components of portal 20 may be provided using any appropriate combination of hardware and/or software and may be implemented on one or more computers at one or more locations.

As described above, each domain 30 includes one or more computer systems 40 executing one or more applications 42. Since domains 30 may be controlled by entities other than the management entity assigned to monitor and manage applications 42, and since domains 30 have associated firewalls 50 limiting access to applications 42, a communication layer 60 and an application monitoring and management layer 70 are included in each domain 30 to provide portal 20 with access to applications 42. Layers 60 and 70 may be integral to or separate from one another and may be implemented using any appropriate combination of hardware and/or software executing or one or more computers.

Exemplary communication layer 60 includes a web server 62 and a servlet engine 64. Since typical firewalls 50 are configured (or may be readily reconfigured) to allow HTTP traffic to pass, portal 20 and communication layer 60 may communicate using HTTP or other suitable web-based communication protocols. Web server 62 and web browser 22 enable such HTTP communications between portal 20 and communication layer 60 (and firewall 50 passes any such communications). The use of HTTP or other similar suitable protocols simplifies communications between portal 20 and domains 30 and reduces or eliminates reliance on private or other special connectivity to domains 30. Furthermore, the use of a standard and relatively simple communication architecture such as HTTP allows system 10 to be readily modified and scaled. However, it should be understood that any appropriate communication technique may be used.

As described below, notifications or other information relating to applications 42 may be obtained and stored by application monitoring and management layer 70 in a database. In one embodiment, to communicate such information to portal 20, servlet engine 64 may be used to gather appropriate information from the database and to generate a web page or other appropriate content for communication by web server 62 to portal 20. Servlet engine 64 (such as a JRUN engine produced by ALLAIRE) executes servlets that are used to create this content. A servlet is a program, such as a JAVA program, that receives an HTTP or similar request, dynamically generates a response to the request, and communicates the response to web server 62 in the form of a hypertext markup language (HTML) file or other appropriate format (for communication to web browser 22). Like a common gateway interface (CGI) script, servlets may query a database and generate content based on the results of the query. Servlets may also be used to receive commands in HTTP format from portal 20 and to communicate these commands (after any appropriate format conversion) to application monitoring and management layer 70. For example, a user of portal 20 may select a "link" on a web page to issue a command and a servlet may receive this selection and communicate the command to application management layer 70. Although the use of servlets and servlet engine 64 is described, any other appropriate method for obtaining information from application management layer 70 (such as CGI scripts or direct communication between web server 62 and application management layer 70) may be used.

Application management layer 70 is responsible for monitoring applications 42 and implementing commands received from portal 20. Application management layer 70 includes one or more agents 72 that may reside, for example, on the computer system 40 on which corresponding applications 42 being monitored are executing. Each agent 72 includes one or more monitors 74, which are managed objects (such as JAVA objects), that may be used to monitor or manage specific corresponding applications 42 or portions of such applications 42. For example, a monitor 74 may scan a log file produced by its corresponding application 42 to determine if selected events have occurred. The log file may document problems with application 42 and monitor 74 may scan for one or more problematic patterns reflected in the log file. Another monitor 74 may communicate with the same or a different corresponding application 42 to determine the state of the application 42 (for example, busy, idle, or not responding). Yet another monitor 74 may watch a communication port of the same or a different corresponding application 42. Monitors 74 may perform any appropriate monitoring and management functions. In an exemplary embodiment, agents 72 are JAVA Management Extensions (JMX) agents and monitors 74 are JAVA managed beans (MBeans); however, any appropriate agents 72 and monitors 74 may be used. One or more monitors, perhaps associated with multiple agents 72, may be used to monitor a single corresponding application 42.

Monitors 74 may generate notifications (or other similar messages) regarding events that have occurred in a monitored application 42 and may communicate these notifications to the associated agent 72. Based on notifications received from monitors 74, an agent 72 may take actions to notify a user of portal 20 about a problem with an application 42 or take appropriate action to remedy the problem. For example only and without limitation, an agent 72 may send e-mail or pager alerts to appropriate parties, log notifications to a database 76, or restart an application 42 that has failed. Agent 72 may use a gateway 78 to log notifications to database 76. In one embodiment, events service 80 provides the capability for a user of portal 20 to subscribe to particular notifications from monitors 74, such as notifications of state changes for a particular application 42 or an alert regarding an application 42. Based on a subscription to particular notifications with events service 80, gateway 78 receives and forwards appropriate notifications from agent 72 to database 76 (where the notifications are stored for later retrieval by servlet engine 64, as described above). Furthermore, gateway 78 may forward notifications to other management clients, such as a Simple Network Management Protocol (SNMP) manager.

Application management layer 70 also includes a system manager 82 that provides an interface for a management entity to interface with and control agents 72 and other components of application management layer 70. In an exemplary embodiment, system manager 82 may include a JMX manager. Although a single computer system 40 is illustrated, system manager 82 may be used to provide an interface to agents 72 associated with multiple computer systems 40 in a domain 30. System manager 82 acts as a broker for agents 72 and enables communications between a management client, such as portal 20, and agents 72. In one embodiment, system manager 82 provides public application program interfaces (APIs) that allow portal 20 to interact with agents 72 and to subscribe to notifications using events service 80. For example, using an agent API, portal 20 may command an agent 72 to start, stop, or modify the operation of an application 42, may instruct an agent 72 to log particular events associated with an application 42, and may configure an agent 72 to operate in any other suitable manner. System manager 72 may also monitor the other components of application management layer 70 to ensure that they are functioning properly.

Application management layer 70 further includes a dynamic lookup service 84 that provides a dynamic registry where agents 72 and any other components of application management layer 70 may register and unregister. System manager 82 may use this dynamic lookup service 84 to identify an agent 72 and to establish communications between an agent 72 and portal 20. Dynamic lookup service 84 also provides a "heartbeat" service by monitoring agents 72. If an agent 72 terminates normally or abnormally, dynamic lookup service 84 unregisters the agent 72 and notifies system manager 82 or any other appropriate entity (such as portal 20) that corrective action may need to be taken. Application management layer 70 also includes a security service 86 that provides a permissibility mechanism which ensures that only authorized users or clients are able to access particular components of application management layer 70. The various components of application management layer 70 described above, including agents 72 and associated monitors 74, may be remote from or embedded in applications 42 being monitored and managed. Furthermore, these components may be implemented using any appropriate combination of hardware and/or software associated with one or more computers at one or more locations.

In many cases, the same management entity (such as an ASP) may provide monitoring and managing services for multiple domains 30. For example, an entity may be hired to monitor and manage the operation of multiple electronic marketplaces implemented using applications 42 in multiple domains 30 or the operation of business processes in domains 30 associated with multiple enterprises. Without the use of the present invention, such a management entity may be required to operate monitoring and management systems locally at each domain 30 if the entity does not have direct access to applications 42 due to the presence of firewalls 50. However, the use of communication layer 60 and application management layer 70 in a domain 30 allows the management entity to monitor and manage a number of domains 30 from a single remote location (portal 20) and does not require that the entity be granted special access (for example, through the use of a virtual private network) to the domains 30 through their associated firewalls 50. Furthermore, if appropriate, information from multiple domains 30 may be aggregated and displayed to a user of portal 20 in a single view to increase the efficiency of the monitoring and management process.

Figure 3:
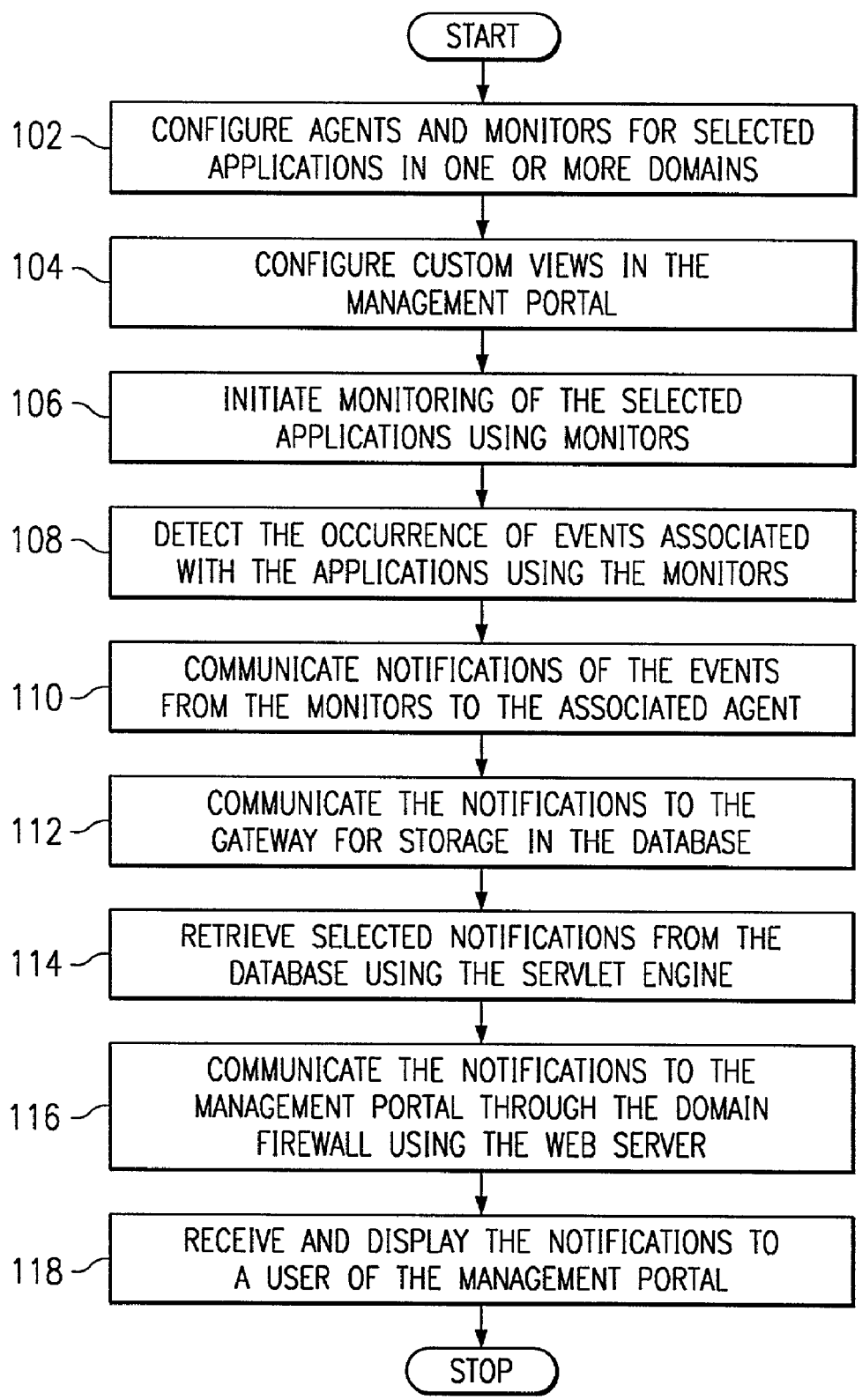
FIG. 3 illustrates an exemplary method for monitoring applications using a monitoring and management portal.

FIG. 3 illustrates an exemplary method for monitoring applications 42 using portal 20. The method begins at step 102, where a user of portal 20 configures one or more agents 72 and monitors 74 to monitor selected applications 42 in one or more domains 30. As described above, the user may configure agents 72 and monitors 74 using HTTP communications and one or more APIs provided by system manager 82 or other components of the associated application management layer 70. At step 104, the user may also configure custom views or displays so that selected information may be obtained and displayed by web browser 22 and user interface 24 in a desired format. The user may then initiate the monitoring of the selected applications 42 at step 106 by issuing one or more commands to application management layers 70 of the selected domains 30.

At step 108, the selected monitors 74 detect the occurrence of events relating to applications 42. For example, a first monitor 74 may communicate with its corresponding application 42 to determine the state of the application 42 and a second monitor 74 may scan a log file associated with the same or a different corresponding application 42. Monitors 74 report detected events to their respective agents 72 though the communication of notifications to the agents 72 at step 110. Although the detection and notification of events is illustrated as two steps in a sequence of steps, it should be understood that detection and notification may occur substantially continuously during the operation of system 10. At step 112, an agent 72 that has received a notification from an associated monitor 74 communicates the notification to gateway 78 for storage in database 76. As described above, agent 72 may also communicate the notification to a user as an e-mail, or pager or other message and/or to another management client. Agent 72 may modify the content or format of a notification received from a monitor 74 as appropriate for the intended recipient of the notification.

At step 114, a servlet executed by servlet engine 64 queries database 76 to retrieve selected notifications. This query may be performed on a periodic basis or at selected times, in response to the selection by a user of portal 20 of particular applications 42 or types of events that the user desires to be monitored (for example, through the customization of a display), in response to a current request by the user for an update with respect to particular events or applications 42, or for any other appropriate reason. As described above, the servlet may generate an HTML response or other appropriate content including the notifications (although they may be in modified form) to web server 62. Web server 62 communicates the notifications through firewall 50 to portal 20 at step 116. These notifications may be sent using HTTP or any other appropriate communication protocol. At step 118, web browser 22 receives the notifications (in the form of an HTML page or other appropriate content) and the notifications are displayed to a user of portal 20 using user interface 24. The notifications may be modified as appropriate for display to the user (for example, in a graphical format). The user may then take appropriate actions based on the notifications. Therefore, embodiments of the present invention allow the management entity to monitor and manage a number of domains 30 from a single remote location (portal 20) and do not require that the entity be granted special access to the domains 30 through their associated firewalls 50. Furthermore, if appropriate, information from multiple domains 30 may be aggregated and displayed to a user of portal 20 in a single view to increase the efficiency of the monitoring and management process.

Figure 4:
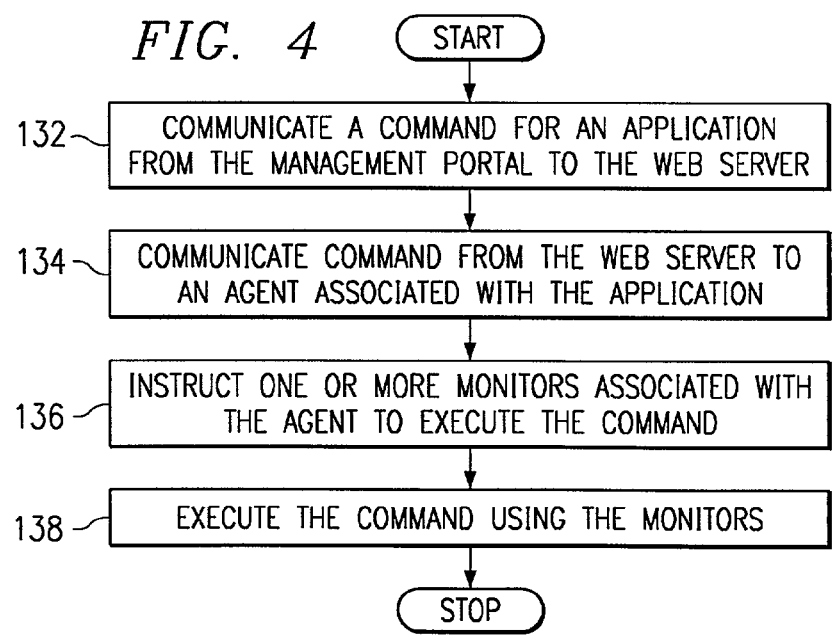
FIG. 4 illustrates an exemplary method for managing applications using a monitoring and management portal.

FIG. 4 illustrates an exemplary method for managing applications 46 using portal 20. The method begins at step 132, where a user of portal 20 communicates a command or other appropriate message for an application 42 to a web server 62 (or any other appropriate component) of a domain 30. The command may be communicated by the user in response to the receipt of a notification relating to an application 42 or for any other appropriate reason. As an example only, the command may instruct a particular application 42 to restart after the user has received a notification that the application 42 has failed. The command may be communicated to web server 62 using HTTP or any other communication protocol allowing the communication to pass through the firewall 50 of the domain 30.

At step 134, the command is received by the web server 62 and web server 62 communicates the command to the one or more agents 72 associated with the one or more applications 42 to which the command is directed. Web server 62 may modify the content or format of the command as appropriate for the receiving agent 72 (for example, according to an API provided by system manager 82 for the agent 72). The agent 72 receiving the command instructs one or more monitors 74 to execute the command or otherwise act upon the message from portal 20 at step 136. Agent 72 may determine an appropriate monitor 74 to execute a command based on the monitor's assigned interaction with the application 42 for which the command was given. At step 138, one or more monitors 74 execute the command or act upon the message as instructed by corresponding agents 72. Therefore, embodiments of the present invention allow the management entity to communicate commands to applications 42 in a number of domains 30 from a single remote location (portal 20) and do not require that the entity be granted special access to the domains 30 through their associated firewalls 50.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for enabling remote monitoring and management of one or more applications within a domain, the domain being one of a plurality of such domains, the system comprising:
   one or more computers within the domain and coupled to a network, each operable to execute one or more applications being monitored and managed;
   a firewall operable to limit access to the applications within the domain from the network;
   an application management layer within the domain comprising:
      one or more agents each operable to monitor one or more corresponding applications in response to a command received from a monitoring and management portal coupled to the network outside the domain, and generate notifications in response to the occurrence of events associated with the corresponding applications; and
      a gateway operable to receive one or more of the notifications and store the notifications in a database; and
   a communication layer within the domain operable to:
      retrieve one or more of the notifications from the database in response to a request received from the monitoring and management portal coupled to the network outside the domain, the request communicated to the communication layer using a communication protocol providing access through the firewall; and
      communicate the notifications to the monitoring and management portal using the communication protocol to enable remote monitoring and management of the associated applications.

2. The system of claim 1, wherein each agent includes one or more monitors each operable to interface with a particular corresponding application.

3. The system of claim 1, wherein one or more of the notifications comprise information regarding the state of an associated application.

4. The system of claim 1, wherein the communication layer comprises:
   a servlet engine operable to execute a servlet, the servlet operable to:
      query the database to retrieve the one or more notifications from the database; and
      generate a response including the notifications that may be interpreted by a web browser within the monitoring and management portal; and
   a web server operable to receive the response from the servlet engine and communicate the response to the web browser using the network.

5. The system of claim 1, wherein the communication protocol comprises hypertext transport protocol (HTTP).

6. The system of claim 1, wherein the request from the monitoring and management portal comprises a request for the state of a particular application.

7. The system of claim 1, wherein the request from the monitoring and management portal comprises a request for all notifications of a particular type relating to one or more selected applications in one or more selected domains.

8. The system of claim 1, wherein the applications comprise electronic marketplace enabling applications.

9. The system of claim 1, wherein the applications comprise business processes.

10. The system of claim 1, wherein the domain is distributed from others of the plurality of domains.

11. The system of claim 1, wherein:
    the communication layer is further operable to:
       receive a command for a particular application communicated from the monitoring and management portal using a communication protocol providing access through the firewall associated with each selected domain; and
       communicate the command to an agent associated with the application to which the command is directed; and
    the agent is further operable to execute the command using a monitor within the agent associated with the application to which the command is directed and corresponding to the particular application, the monitor operable to interface with the particular corresponding application.

12. A method for remotely monitoring applications across a plurality of domains, comprising:
    detecting the occurrence of events associated with a plurality of applications executed on a plurality of computers within a plurality of domains; each domain coupled to a network and including a firewall limiting access to the applications within the domain, wherein the detecting is initiated in response to a command received from a monitoring and management portal coupled to the network outside the domain;
    generating notifications in response to the occurrence of the events, each notification associated with at least one application;
    storing at least some of the notifications in databases within the domains that comprise the associated applications;
    retrieving notifications from the databases of a plurality of selected domains in response to a request received from the monitoring portal coupled to the network outside the domain, the request communicated to the selected domains using a communication protocol providing access through the firewalls associated with the selected domains;
    communicating the retrieved notifications from each of the selected domains to the monitoring portal using the communication protocol; and
    making the retrieved notifications from each of the selected domains available at a computer associated with the monitoring portal for viewing in a unified manner.

13. The method of claim 12, wherein detecting the occurrence of events comprises monitoring each application using one or more agents within the associated domain, each agent including one or more monitors each operable to interface with a particular corresponding application within the domain.

14. The method of claim 13, further comprising configuring the agents and monitors from the monitoring portal using HTTP communications with web servers within the domains, each web server operable to communicate configuration instructions received from the monitoring portal to the agents within the associated domain.

15. The method of claim 12, wherein one or more of the notifications comprise information regarding the state of an application.

16. The method of claim 12, further comprising:
generating a response at each domain including the retrieved notifications for the domain that may be interpreted by a web browser within the monitoring portal; and
communicating the response to the web browser using the network.

17. The method of claim 12, further comprising:
receiving the retrieved notifications from each of the selected domains at the monitoring portal; and
aggregating the retrieved notifications from each of the selected domains for display to a user of the monitoring portal in a unified view.

18. The method of claim 12, wherein the communication protocol comprises hypertext transport protocol (HTTP).

19. The method of claim 12, wherein the request from the monitoring portal comprises a request for the state of a particular application.

20. The method of claim 12, wherein the request from the monitoring portal comprises a request for all notifications of a particular type relating to one or more selected applications in one or more selected domains.

21. The method of claim 12, wherein the applications comprise electronic marketplace enabling applications.

22. The method of claim 12, wherein the applications comprise business processes.

23. The method of claim 12, wherein the domains are distributed from one another.

24. A method for remotely managing applications across a plurality of domains, comprising:
generating a command for each of a plurality of applications at a management portal coupled to a network, the applications executed on a plurality of computers within a plurality of domains, the applications being of a common type, each domain coupled to the network and including a firewall limiting access to the applications within the domain, wherein at least one command is for initiating monitoring of at least one of the applications;
communicating the commands to a communication layer within each of one or more selected domains using a communication protocol providing access through the firewall associated with each selected domain, each selected domain comprising an application to which a command is directed;
within each selected domain, communicating the command from the communication layer to an agent associated with the application to which the command is directed; and
within each selected domain, executing the command using a monitor within the agent associated with the application to which the command is directed and corresponding to the particular application, the monitor operable to interface with the particular corresponding application.

25. The method of claim 24, wherein the communication protocol comprises hypertext transport protocol (HTTP).

26. The method of claim 24, wherein the communication layer within each domain comprises a web server operable to receive the command from the management portal.

27. The method of claim 24, wherein the communication layer within each domain is operable to:

communicate with the management portal using hypertext transport protocol (HTTP); and
communicate with the agents within the domain using one or more application program interfaces associated with each agent.

28. The method of claim 24, wherein the applications comprise electronic marketplace enabling applications.

29. The method of claim 24, wherein the applications comprise business processes.

30. The method of claim 24, wherein the domains are distributed from one another.

31. Software for enabling remote monitoring and management of one or more applications within a domain, the domain being one of a plurality of such domains, the software embodied in a computer-readable medium and, when executed by a computer, operable to:
detect, in response to a command received from a monitoring and management portal coupled to the network outside the domain, the occurrence of events associated with a plurality of applications executed on a plurality of computers within a plurality of domains, each domain coupled to a network and including a firewall limiting access to the applications within the domain;
generate notifications in response to the occurrence of the events, each notification associated with at least one application;
store at least some of the notifications in databases within the domains that comprise the associated applications;
retrieve notifications from the databases of a plurality of selected domains in response to a request received from the monitoring portal coupled to the network outside the domain, the request communicated to the selected domains using a communication protocol providing access through the firewalls associated with the selected domains; and
communicate the retrieved notifications from each of the selected domains to the monitoring portal using the communication protocol.

32. A system for enabling remote monitoring and management of one or more applications within a domain, the domain being one of a plurality of such domains, the system comprising:
means for detecting, in response to a command received from a monitoring and management portal coupled to the network outside the domain, the occurrence of events associated with a plurality of applications executed on a plurality of computers within a plurality of domains, each domain coupled to a network and including a firewall limiting access to the applications within the domain;
means for generating notifications in response to the occurrence of the events, each notification associated with at least one application;
means for storing at least some of the notifications in databases within the domains that comprise the associated applications;
means for retrieving notifications from the databases of a plurality of selected domains in response to a request received from a monitoring portal coupled to the network outside the domain, the request communicated to the selected domains using a communication protocol providing access through the firewalls associated with the selected domains; and
means for communicating the retrieved notifications from each of the selected domains to the monitoring portal using the communication protocol.

33. A system for enabling remote monitoring and management of one or more electronic marketplace enabling applications within a domain, the domain being one of a plurality of distributed domains, the system comprising:

one or more computers within the domain and coupled to a network, each operable to execute one or more electronic marketplace enabling applications being monitored and managed;

a firewall operable to limit access to the applications within the domain from the network;

an application management layer within the domain comprising:

one or more agents each operable to monitor one or more corresponding applications in response to a command received from a monitoring and management portal coupled to the network outside the domain, and generate notifications in response to the occurrence of events associated with the corresponding applications; and a gateway operable to receive one or more of the notifications and store the notifications in a database; and a communication layer within the domain comprising:

a servlet engine operable to execute a servlet, the servlet operable to:

query the database to retrieve one or more of the notifications from the database in response to a request received from a monitoring and management portal coupled to the network outside the domain, the request communicated to the communication layer using hypertext transport protocol (HTTP); and generate a response including the notifications that may be interpreted by a web browser within the monitoring and management portal; and a web server operable to receive the response from the servlet engine and communicate the response to the web browser through the firewall using HTTP to enable remote monitoring and management of the associated applications.

34. A method for remotely monitoring electronic marketplace enabling applications across a plurality of distributed domains, comprising:

receiving a command from a monitoring portal outside the domains, detecting, in each domain in response to receipt of the command, the occurrence of events associated with a plurality of electronic marketplace enabling applications executed on a plurality of computers within the respective domains, each domain coupled to a network and including a firewall limiting access to the applications within the domain;

generating notifications in response to the occurrence of the events, each notification associated with at least one application;

storing at least some of the notifications in databases within the domains that comprise the associated applications;

retrieving notifications from the databases of a plurality of selected domains in response to a request received from the monitoring portal coupled to the network outside the domains, the request communicated to the selected domains using hypertext transport protocol (HTTP);

generating a response at each domain including the retrieved notifications for the domain that may be interpreted by a web browser within the monitoring portal;

communicating the response from each of the selected domains to the web browser through the firewall using HTTP; and making the retrieved notifications from each of the selected domains available at a computer associated with the monitoring portal for display to a user of the monitoring portal in a unified view in which the notifications are aggregated.

35. A method for remotely managing electronic marketplace enabling applications across a plurality of distributed domains, comprising:

generating, at a management portal coupled to a network, a command for initiating monitoring of each of a plurality of electronic marketplace-enabling applications, the applications executed on a plurality of computers within a plurality of domains, the applications being of a common type, each domain coupled to the network and including a firewall limiting access to the applications within the domain;

communicating the commands to a web server within each of one or more selected domains using hypertext transport protocol (HTTP), each selected domain comprising an application to which a command is directed within each selected domain, communicating the command from the web server to an agent associated with the application to which the command is directed; and within each selected domain, executing the command using a monitor within the agent associated with the application to which the command is directed and corresponding to the particular application, the monitor operable to interface with the particular corresponding application.

* * * * *

UNITED STATES PATENT AND TRADEMARK OFFICE
CERTIFICATE OF CORRECTION

PATENT NO. : 7,062,540 B2  Page 1 of 1
APPLICATION NO. : 09/755751
DATED : June 13, 2006
INVENTOR(S) : Padma P. Reddy and Rubesh Mehta It is certified that error appears in the above-identified patent and that said Letters Patent is hereby corrected as shown below:

1. Add a "Related U.S. Application Data" section in the cover page, with the following:

Related U.S. Application Data
Continuation-in-part of application No. 09/639,491, August 15, 2000.

2. Replace the paragraph appearing at column 1, lines 9-13, with the following:

This application is a continuation-in-part of U.S. Application Serial No. 09/639,491, filed August 15, 2000, entitled "COMPUTER-IMPLEMENTED SYSTEM AND METHOD FOR MONITORING AND MANAGING BUSINESS PROCESS AND ASSOCIATED RESOURCES."

Signed and Sealed this

Thirtieth Day of March, 2010

David J. Kappos
*Director of the United States Patent and Trademark Office*